United States Patent

[11] 3,539,050

[72] Inventors Steven S. Davis
 Bountiful, and
 Kent L. Davis and John C. Brozovich, Salt Lake City, Utah
[21] Appl. No. 653,793
[22] Filed July 17, 1967
[45] Patented Nov. 10, 1970
[73] Assignee Envirotech Corporation
 Salt Lake City, Utah
 a corporation of Delaware

[54] DISC SECTOR AND METHOD OF ASSEMBLY THEREOF
 3 Claims, 4 Drawing Figs.
[52] U.S. Cl..................................................... 210/486
[51] Int. Cl..................................................... B01d 33/26

[50] Field of Search............................................ 210/486

[56] References Cited
UNITED STATES PATENTS
| | | | |
|---|---|---|---|
| 2,813,632 | 11/1957 | Muller.......................... | 210/486 |
| 3,019,905 | 2/1962 | Baker et al.................... | 210/486 |
| 3,291,312 | 12/1966 | Peterson....................... | 210/486X |

Primary Examiner—John W. Adee
Attorney—C. Harvey Gold and Robert R. Finch

ABSTRACT: A disc sector assembly comprising a metal bell adaptor and a thermoplastic sector secured together by means of substantial irregularities in the wall of the adaptor to which the sector is conformed by localized softening and cooling of the sector while in place against the adaptor wall.

INVENTORS.
STEVEN S. DAVIS
KENT L. DAVIS
JOHN C. BROZOVICH
BY: C. Hannyfold

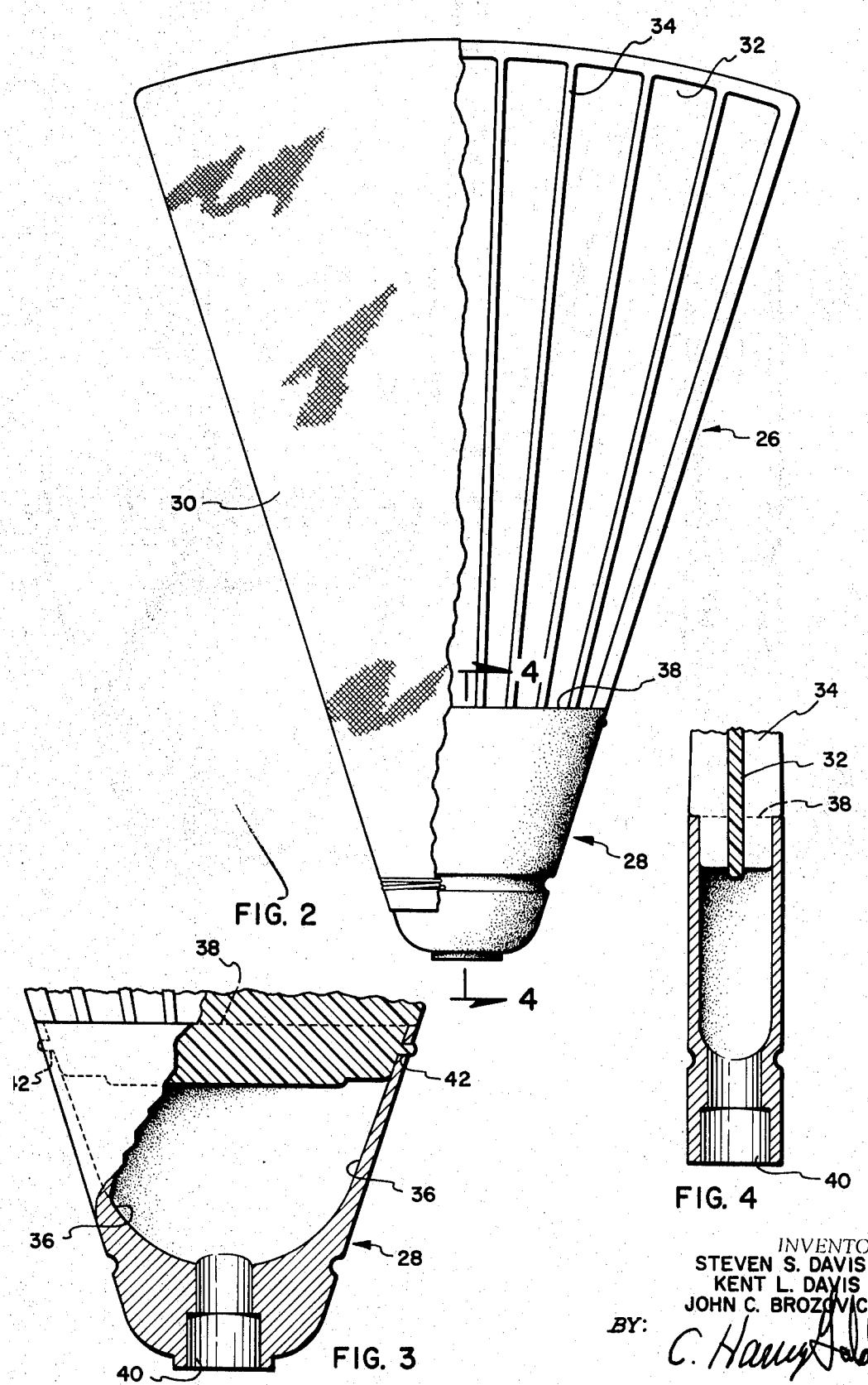

DISC SECTOR AND METHOD OF ASSEMBLY THEREOF

This invention relates generally to filter disc sectors of the type comprising a wedge shaped sector having a bell adaptor fitted over its apex for securing it to a rotating center shaft on a filter. More particularly, it relates to a method for securing a thermoplastic sector to a metal adaptor to form a sector assembly; and to a sector assembly formed in accordance with the invention.

The primary object of the invention is to provide a disc sector assembly comprising a sector of thermoplastic material and a metal bell adaptor rigidly secured together as an integral unit.

Another important object is to provide a novel and inexpensive method for locking a metal bell adaptor and a thermoplastic sector together to form a rigid assembly and for easily separating said adaptor and sector.

Briefly the apparatus invention comprises a disc sector assembly having a thermoplastic resin sector fitted to a metal bell adaptor and locked thereto by virtue of the plastic material irregularities in the adaptor walls.

The method invention comprises the steps of pressing the thermoplastic sector into a bell adaptor and maintaining the temperature of the adaptor high enough to soften the plastic until it conforms to irregularities in the wall surface of the adaptor then cooling the assembly to solidify the plastic whereby it cooperates with the wall irregularities to form a lock.

So that the invention may be more readily understood and carried into effect, reference is made to the accompanying drawings which are offered by way of example only and are not to be taken as limiting the invention, the scope of which is defined by the appended claims which obviously embrace equivalent structures.

In the drawings:

FIG. 2 is a plan view of a disc sector secured to a bell adaptor. The disc sector is shown partially covered with a suitable filter medium.

FIG. 3 is an enlarged plan view of a bell adaptor shown partially broken away to illustrate an irregularity in the form of a cavity in the adaptor's sidewall for locking it to the sector.

FIG. 4 is a sectional view taken in the plane of line 4-4 of FIG. 2.

Figure 1:
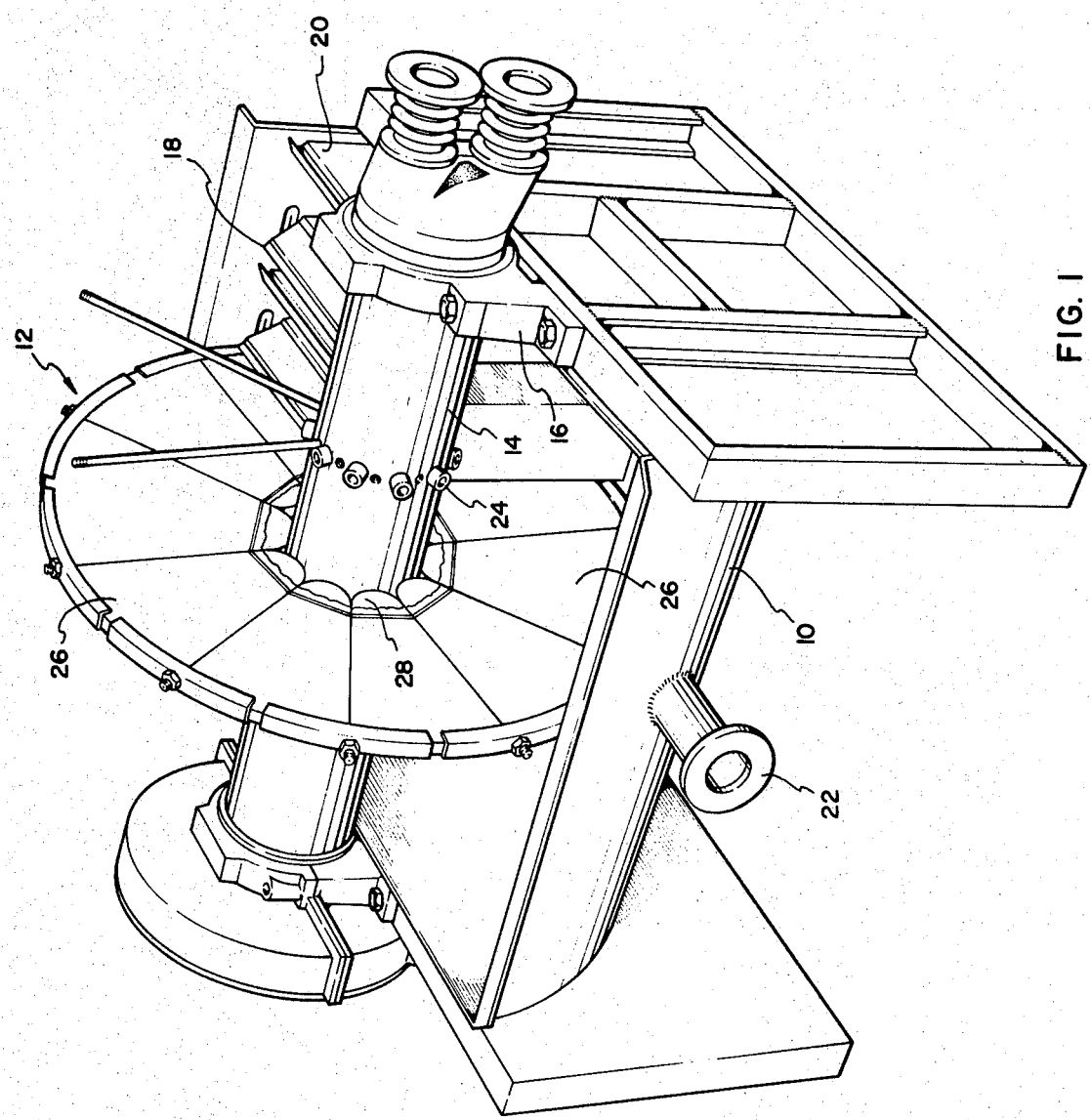
FIG. 1 is a perspective view of a conventional rotary disc filter showing a filter disc formed from eight disc sectors attached to bell adaptors which are mounted on a rotatable shaft. For convenience, only one disc is shown in the drawings.

FIG. 1 illustrates a rotary disc filter comprising an elongated slurry tank 10 with at least one filter disc 12 secured to a rotatable tubular shaft 14 journaled in bearings 16 at the tank ends. Scrapers 18 are provided adjacent the disc faces to assist in cake discharge and direct cake into a collection bin 20. Slurry to be filtered is supplied through a suitable inlet 22. Filtrate is drawn through a filter medium 30 covering each sector thence through a port into the tubular shaft for eventual discharge.

A complete disc is formed from several sector assemblies and each sector assembly comprises a sector 26 rigidly secured to a bell adaptor 28 by which the assembly is in turn mounted on the center shaft. As is usual, the sector comprises a wedge shaped base 32 having surface ridges 34 for supporting filter cloth and directing flow to the bell adaptor.

The sector is cast, molded or otherwise formed from thermoplastic material, such as polyethylene, polypropylene, cellulose propionate, acrylate, polyvinyl chloride, and the like, having a softening temperature below that of the bell.

The bell adaptor 28 may be of conventional design having interior sidewalls 36 tapering inwardly from its receiving end 38 to a discharge stub 40 which connects it to the tubular shaft 14. The adaptor is usually constructed from a strong metal, such as cast iron or steel, having a higher softening temperature than the sector material. If a strong high melting plastic is available it may be substituted for the metal bell and the adaptor may be of different shape or design.

For assembly, the adaptor and sector are pressed together and the temperature of the adaptor, at least in the vicinity of the irregularity, is maintained above the softening temperature of the sector and the sector pressed in place. Softening temperature of a material is defined as the temperature at which the material readily deforms and flows when a pressure is applied to it. The bell may be heated before or after the sector is fitted to it, but in either case the elevated temperature is maintained sufficiently long so that the sector material softens and conforms to the adaptor walls then is permitted to cool to solidify the plastic.

To provide the positive lock between the adaptor and sector an irregularity, such as a port 42, is provided in at least one sidewall of the adaptor. Upon assembly, the sector is pressed into the adaptor and the temperature of the sector, at least in the area of the port 42, is maintained above the softening temperature of the sector until sector material flows into or around the irregularity, then the assembly is cooled so the plastic material solidifies in the port and a positive mechanical lock is formed.

Although in the illustrated embodiment, plastic has solidified in the port to act as a lock, obviously the irregularity may take other forms such as corrugations, pins or lugs and the like about which the plastic may form.

To separate the sector and bell it is only necessary to reheat and pull them apart. It is not necessary that the entire adaptor be heated and a suitable lock will be obtained if only that part of the bell containing the irregularity is heated.

The following examples will illustrate the mode of practice of this invention and will demonstrate the results obtainable therefrom:

EXAMPLE 1

A cast iron bell adaptor having tapered interior sidewalls and provided with small ports in the walls was heated to a temperature of about 400°F. The apex of a wedge-shaped polyproplene resin disc sector, having a softening temperature of about 340°F., was then pressed into the receiving end of the adaptor. At this temperature the sector material deformed and flowed against the sidewalls of the bell adaptor and into the port thus conforming to the wall surface and all its irregularities. The assembly was then cooled to solidify the plastic whereupon the disc sector was securely sealed against the sidewalls of and securely locked to the bell adaptor.

EXAMPLE 2

The wall of an iron adaptor with a port provided in one of sidewalls, was heated to a temperature of about 250°F. at the areas near the port. The apex of a wedge-shaped polyethylene resin disc sector, having a softening temperature of about 200°F., was then pushed into the receiving end of the adaptor so that plastic was softened to flow through the port. The adaptor was then cooled to solidify the plastic so the material in the port formed a solid pin locking the two pieces together.

We claim:

1. A rotary filter disc sector assembly comprising a wedge-shaped sector formed from thermoplastic material, a metal bell adapter for mounting on a rotatable shaft fitted to the apex end of said sector, an irregularity in the wall of said adapter, and the thermoplastic material of said sector being conformed to said irregularity.

2. A sector assembly in accordance with claim 1 in which said irregularity comprises an opening in the adaptor wall.

3. The rotary filter disc sector of claim 1 wherein the sector is conformed and locked to said irregularity by subjecting said adapter to a temperature above the softening temperature of said thermoplastic material and subsequently cooling.